(12) United States Patent
Tamura

(10) Patent No.: US 8,456,664 B2
(45) Date of Patent: Jun. 4, 2013

(54) IMAGE FORMING APPARATUS, METHOD FOR CONTROLLING IMAGE FORMING APPARATUS, AND STORAGE MEDIUM

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/229,239

(22) Filed: Sep. 9, 2011

(65) Prior Publication Data

US 2012/0069379 A1    Mar. 22, 2012

(30) Foreign Application Priority Data

Sep. 22, 2010 (JP) ................................. 2010-212397

(51) Int. Cl.
*G06F 15/00* (2006.01)
*G06K 1/00* (2006.01)

(52) U.S. Cl.
USPC ......................................... 358/1.14; 358/1.15

(58) Field of Classification Search
None
See application file for complete search history.

(56) References Cited

FOREIGN PATENT DOCUMENTS

JP    2008-158695 A    7/2008

*Primary Examiner* — Thierry Pham
(74) *Attorney, Agent, or Firm* — Canon USA, Inc., I.P. Division

(57) ABSTRACT

When receiving a notification indicating that the communication is performed using an encrypted communication protocol, a display unit displays a screen based on screen information so as to display a second icon which indicates that a web server uses the encrypted communication protocol to communicate with an external server and is different from a first icon indicating that a browser uses the encrypted communication protocol to communicate with the web server.

7 Claims, 12 Drawing Sheets ly protected
IMAGE FORMING APPARATUS, METHOD FOR CONTROLLING IMAGE FORMING APPARATUS, AND STORAGE MEDIUM

BACKGROUND OF THE INVENTION

1. Field of the Invention

The present invention relates to an image forming apparatus, a method for controlling an image forming apparatus, and a storage medium.

2. Description of the Related Art

It is known that an information processing apparatus such as a personal computer (PC) communicates with a web server in a network, and displays a content such as an operation screen provided from the web server on a web browser.

In recent years, some multi function peripherals (MFPs), including scanners and printers, have been provided with the above-described web browser. Such MFPs display a content provided from a web server on their web browsers, and receive various types of instructions from a user.

As one of related technologies, Japanese Patent Application Laid-Open No. 2008-158695 discusses a configuration in which an information processing apparatus includes a web server therein, and communicates with a web server provided in an MFP. In Japanese Patent Application Laid-Open No. 2008-158695, the web server of the information processing apparatus converts a content provided from the web server of the MFP into a format that can be displayed on a web browser of the information processing apparatus. The web browser of the information processing apparatus displays the converted content.

On the other hand, the communication protocol used between a web server inside an information processing apparatus and a web browser of the information processing apparatus is determined based on the setting of the web server of the information processing apparatus. This is because a system is configured in consideration of the fact that the web server of the information processing apparatus is supposed to receive access from a client outside the information processing apparatus. Generally, the communication protocol used in communication between a web server and a web browser is either HyperText Transfer Protocol (HTTP) or HyperText Transfer Protocol over Secure Socket Layer (HTTPS). On the other hand, the protocol used in communication between a web server inside an information processing apparatus and a web server outside the information processing apparatus is determined depending on the communication specification of the web server outside the information processing apparatus.

Therefore, the communication protocol between a web server and a web browser inside an information processing apparatus, and the communication protocol between the web server inside the information processing apparatus and a web server outside the information processing apparatus are determined based on different factors, respectively.

On the other hand, a web browser displays the state of communication with an apparatus or unit which the web browser is actually in communication with. For example, the web browser displays a character string indicating the Uniform Resource Locator (URL) of the apparatus or unit which the web browser is currently in communication with, like "http://abc.com/" or "https://def.com/", in the address bar of the web browser. Further, the web browser displays a key icon to indicate that the communication is in a securely protected state, if the web browser is in communication with the apparatus or unit at the other end using the HTTPS communication protocol.

SUMMARY OF THE INVENTION

According to an aspect of the present invention, an image forming apparatus capable of communicating with an external server includes a browser configured to communicate with a server according to a communication protocol set to the server capable of providing screen information, receive the screen information and display a screen, and a web server. The web server includes an external communication unit configured to receive data from the external server, a determination unit configured to determine whether the external communication unit is in communication with the external server using an encrypted communication protocol for encrypting data for communication, and an internal communication unit configured to transmit, to the browser, a notification indicating that the communication is performed using the encrypted communication protocol and screen information generated based on data received from the external server, in a case where the determination unit determines that the communication is performed using the encrypted communication protocol. The browser includes a display unit configured to display, in a case where the display unit receives the notification which is transmitted from the internal communication unit and indicates that the communication is performed using the encrypted communication protocol, the screen based on the screen information so as to display a second icon which is indicates that the web server uses the encrypted communication protocol to communicate with the external server and is different from a first icon indicating that the browser uses the encrypted communication protocol to communicate with the web server. Further, the image forming apparatus includes a printing unit configured to receive print target data from the external server, convert the received data into print data, and print the converted print data, in a case where printing is instructed via the screen displayed by the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
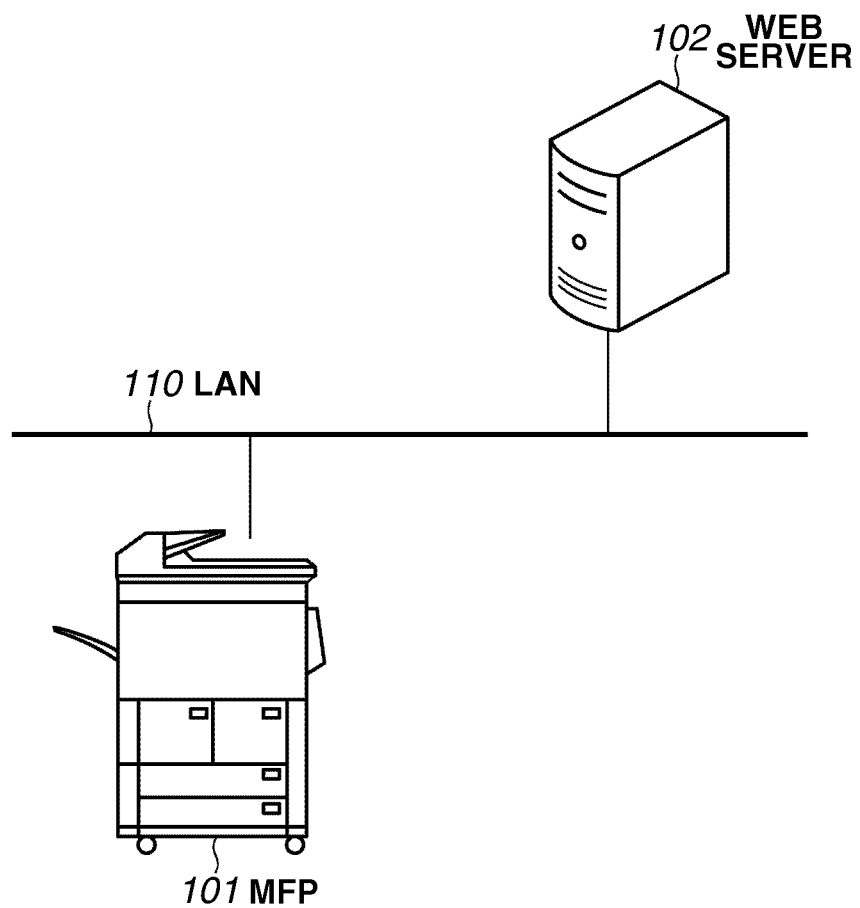
FIG. 1 illustrates an entire information processing system according to a first exemplary embodiment of the present invention.

Various exemplary embodiments, features, and aspects of the invention will be described in detail below with reference to the drawings.

According to Japanese Patent Application Laid-Open No. 2008-158695, the web browser of the information processing apparatus communicates with the web server function inside the information processing apparatus. Therefore, a user, who operates the web browser of the information processing apparatus, can check the communication state (for example, the URL and the communication protocol) with the web server function inside the information processing apparatus.

However, an issue arises when the user, who operates the web browser of the information processing apparatus, communicates with a web server outside the information processing apparatus via the web server inside the information processing apparatus. More specifically, even in this case, the web browser of the information processing apparatus actually communicates with the web server inside the information processing apparatus, so that the communication state displayed by the web browser is the communication state with the web server inside the information processing apparatus. As a result, the user cannot check the communication state with the web server outside the information processing apparatus.

The present invention relates to an image forming apparatus capable of appropriately indicating a communication state with a web server outside an information processing apparatus to a user.

The present invention solves the following issues. For example, consider the case where the communication protocol between a web browser of an MFP and a web server inside the MFP is HTTP, while the communication protocol between the web server inside the MFP and a web server outside the MFP is HTTPS. In this case, HTTPS is used as the communication protocol for communication with the web server outside the MFP, so that the communication is maintained in a secure state. However, despite this fact, the communication state displayed by the web browser of the MFP is HTTP, so that the user may be confused.

As another example, consider the case where the communication protocol between a web browser of an MFP and a web server inside the MFP is HTTPS, while the communication protocol between the web server inside the MFP and a web server outside the MFP is HTTP. In this case, despite the fact that HTTP is used as the communication protocol for communication with the web server outside the MFP, the communication state displayed by the web browser of the MFP is HTTPS. This situation may give a wrong impression to user, who uses the web browser of the MFP, that the communication is maintained in a secure state.

As still another example, consider the case where the communication protocol between a web browser of an MFP and a web server inside the MFP is HTTPS, and the communication protocol between the web server inside the MFP and a web server outside the MFP is HTTPS. In this case, HTTPS is used as the communication protocol to the web server outside the MFP, so that the communication is maintained in a secure state, and the communication state displayed by the web browser of the MFP is HTTPS. Apparently, no problem exists in this situation. However, even this case cannot be free from the issue with a server certificate displayed by the web browser.

The web browser is provided with the function of displaying the server certificate of the web server as a communication partner, if the communication protocol is HTTPS.

When the user of the MFP instructs a display of the server certificate of the server during communication using the function of the web browser, the web browser displays the server certificate used in communication with the web server inside the MFP. There is no measure for allowing the user of the MFP to check information about the server certificate used in communication with the web server outside the MFP.

The above-described issues become noticeable in an apparatus such as an MFP which has a limited display area on the operation unit thereof, and is hardly capable of displaying a screen of an application other than the web browser during an operation of the web browser.

The present invention is about an image forming apparatus, a method for controlling the image forming apparatus, and a program contrived to offer a solution to the above-described issues.

FIG. 1 illustrates an entire information processing system according to a first exemplary embodiment of the present invention. An MFP 101 and a web server 102 are connected to a local area network (LAN) 110 and can communicate with each other. The LAN 110 is denoted as the local area network for convenience of description, but may be replaced with another network such as the Internet.

Figure 2:
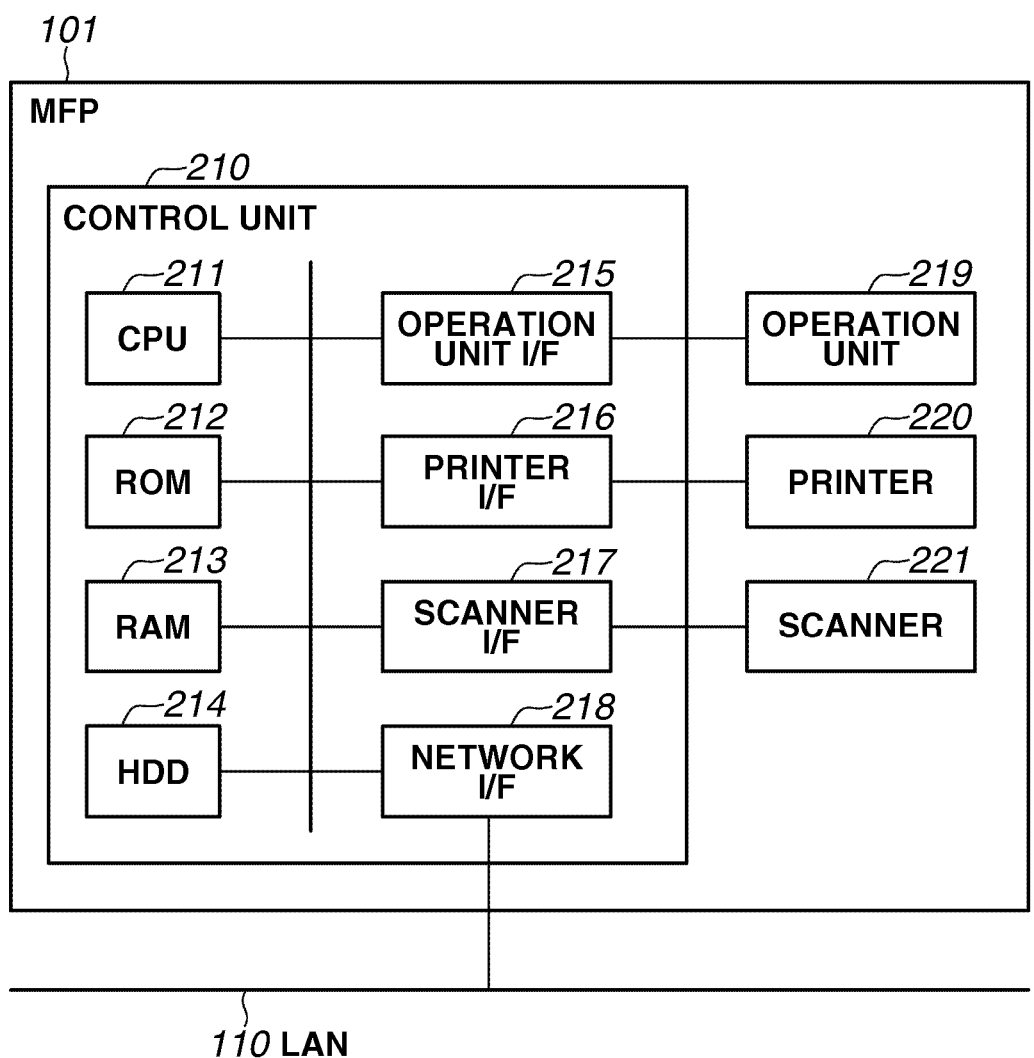
FIG. 2 is a block diagram illustrating a configuration of an MFP 101 according to the first exemplary embodiment of the present invention.

FIG. 2 is a block diagram illustrating a configuration of the MFP 101. A control unit 210 includes a central processing unit (CPU) 211 and controls an overall operation of the MFP 101. The CPU 211 reads out a control program stored in a read only memory (ROM) 212, and performs various types of control such as reading control and transmission control. A random access memory (RAM) 213 is used as a temporary storage area such as a main memory and a work area of the CPU 211.

A hard disk drive HDD (214) stores image data, various programs, or various information tables. An operation unit interface (I/F) 215 connects an operation unit 219 and the control unit 210. The operation unit 219 is equipped with, for example, a liquid crystal display unit capable of functioning as a touch panel, and a keyboard. Further, the MFP 101 is provided with a web browser 400 which will be described below.

The web browser 400 of the MFP 101 analyzes a HyperText Markup Language (HTML) file received from the web server 102, and displays an operation screen based on the description of the received HTML file on the liquid crystal display unit of the operation unit 219. The web browser 400 of the MFP 101 may receive an HTML file transmitted from not only the web server 102 but also another apparatus or unit. For example, the web browser 400 may receive an HTML file transmitted from a servlet application 410 inside the MFP 101 which will be described below.

A printer I/F 216 connects a printer 220 and the control unit 210. Image data to be printed by the printer 220 is transferred from the control unit 210 via the printer I/F 216, and is printed by the printer 220 onto a recording medium.

A scanner I/F 217 connects a scanner 221 and the control unit 210. The scanner 221 reads an image on a document to generate image data, and input the generated image data into the control unit 210 via the scanner I/F 217.

A network I/F 218 connects the control unit 210 (MFP 101) to the LAN 110. The network I/F 218 transmits image data and information to an external apparatus (for example, the web server 102) on the LAN 110, and receives various pieces of information from the external apparatus on the LAN 110.

Figure 3:
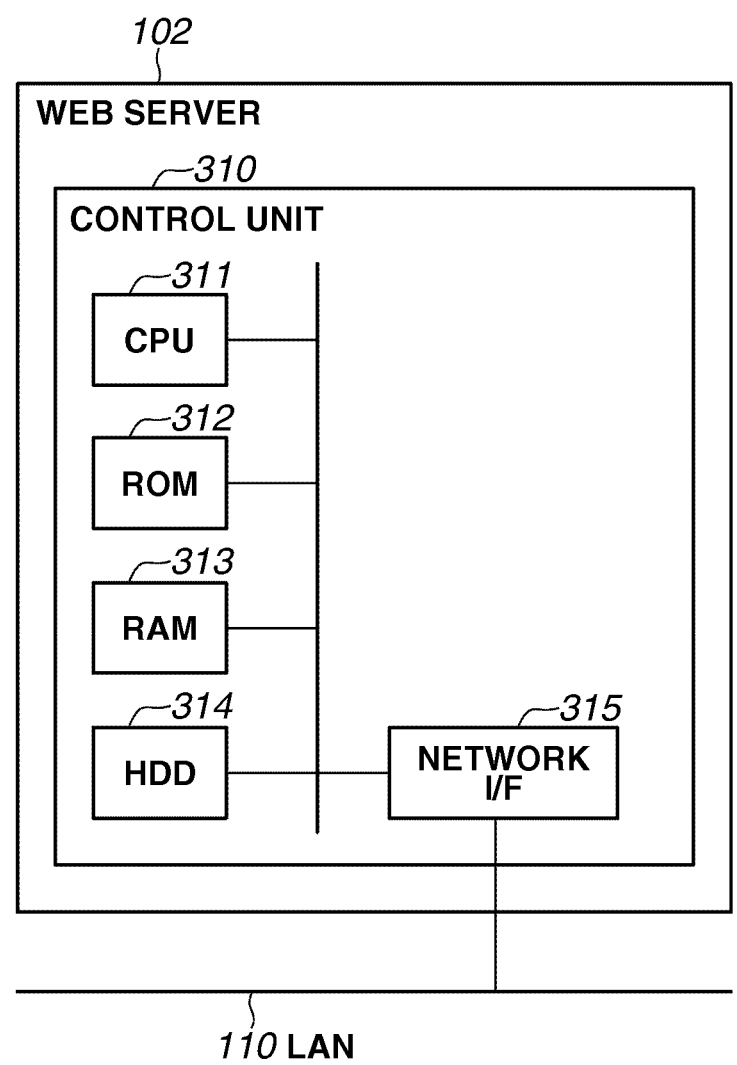
FIG. 3 is a block diagram illustrating a configuration of a web server 102 according to the first exemplary embodiment of the present invention.

FIG. 3 is a block diagram illustrating a configuration of the web server 102. A control unit 310 includes a CPU 311 and controls an overall operation of the web server 102. The CPU 311 reads out a control program stored in a ROM 312, and executes various types of control processing. A RAM 313 is used as a temporary storage area such as a main memory and a work area of the CPU 311. An HDD 314 stores image data, various programs, or various information tables.

A network I/F 315 connects the control unit 310 (web server 102) to the LAN 110. The network I/F 315 transmits and receives various pieces of information to and from another apparatus on the LAN 110.

Figure 4:
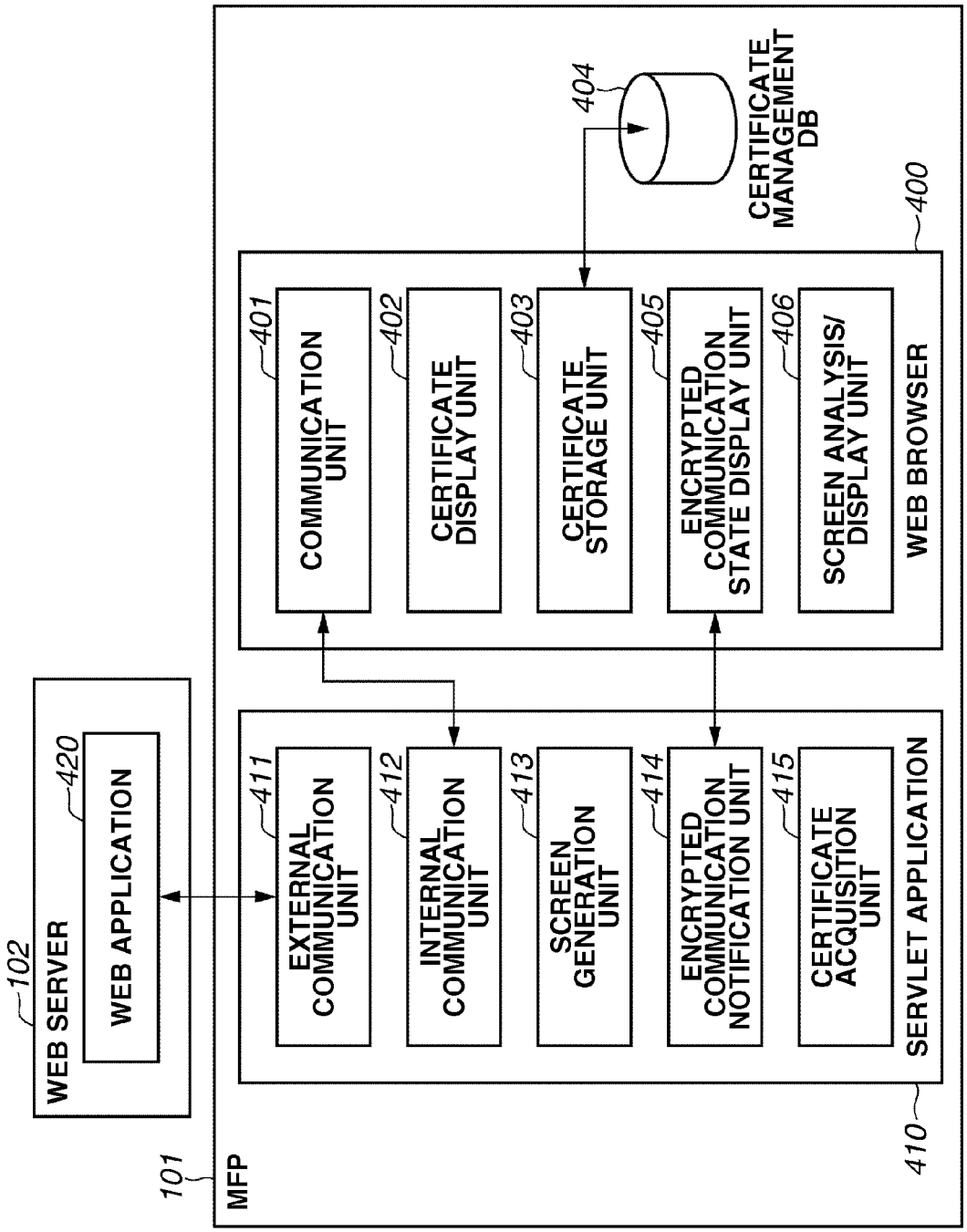
FIG. 4 illustrates a software configuration of the information processing system according to the first exemplary embodiment of the present invention.

FIG. 4 illustrates a software configuration of the entire information processing system. The CPUs 211 and 311 respectively included in the MFP 101 and the web server 102 execute the control programs, thereby realizing the respective units in the configuration illustrated in FIG. 4.

The MFP 101 includes the web browser 400 and the servlet application 410. The CPU 211 included in the MFP 101 executes the control program, thereby realizing the web browser 400 and the servlet application 410, respectively. The web browser 400 is not limited to a browser which displays contents of the web server 102 and the servlet application 410. At the same time, the web server 102 and the servlet application 410 are not limited to a web server and a servlet application which transmit and receive a request/response according to the HTTP protocol. The web browser 400 may be embodied by any unit capable of functioning to acquire a content through communication with any arbitrary server and display the acquired content on a screen.

The web browser 400 includes a communication unit 401, a certificate display unit 402, a certificate storage unit 403, a certificate management database (DB) 404, an encrypted communication state display unit 405, and a screen analysis/display unit 406.

The communication unit 401 communicates with an internal communication unit 412 of the servlet application 410 according to the HTTP protocol or the HTTPS protocol. The communication protocol is determined based on the communication protocol set to the servlet application 410 including the internal communication unit 412. This setting is the communication protocol that a user sets via a setting screen of the MFP 101.

The communication unit 401 transmits information input via an operation screen displayed by the screen analysis/display unit 406 of the web browser 400, as a request to the servlet application 410 which will be described below. Further, the communication unit 401 receives a response (processing result) transmitted from the servlet application 410. The HTTPS protocol is an example of an encrypted communication protocol which encrypts data and transmits the encrypted data, and the HTTP protocol is an example of a communication protocol that is not an encrypted communication protocol.

The certificate display unit 402 displays information about a server certificate used in communication, when the servlet application 410 is in communication using the HTTPS protocol with a web application 420 included in the web server 102 outside the MFP 101. More specifically, the certificate display unit 402 requests the certificate storage unit 403 to acquire the server certificate information, upon a reception of a request from the screen analysis/display unit 406. After receiving the server certificate information from the certificate storage unit 403, the certificate display unit 402 transmits the server certificate to the screen analysis/display unit 406.

The certificate storage unit 403 determines whether the servlet application 410 and the web application 420 is in communication with each other using the HTTPS protocol, upon a reception of a request from the encrypted communication state display unit 405. As a result of the determination, if the communication is in the HTTPS protocol, the certificate storage unit 403 stores the information about the server certificate used in the communication, in the certificate management DB 404. Further, the certificate storage unit 403 reads out the stored server certificate from the certificate management DB 404 and transmits the certificate to the certificate display unit 402, in response to a request from the certificate display unit 402. The server certificate is stored in the memory of the web server 102.

The encrypted communication state display unit 405 receives an encrypted communication notification from an encrypted communication notification unit 414 of the servlet application 410, and determines whether the communication state between the servlet application 410 and the web application 420 is HTTPS. If the communication state is HTTPS, the encrypted communication state display unit 405 requests the screen analysis/display unit 406 to display the communication state between the servlet application 410 and the web application 420. Further, the encrypted communication state display unit 405 acquires a server certificate contained in the encrypted communication notification, and requests the certificate storage unit 403 to store the server certificate.

The screen analysis/display unit 406 analyzes an HTML file contained in a response that the communication unit 401 receives, and displays an operation screen on the operation unit 219 based on the analysis result. At this time, the screen analysis/display unit 406 displays an encrypted communication state, if the screen analysis/display unit 406 receives a request from the encrypted communication state display unit 405. Further, the screen analysis/display unit 406 receives a server certificate display instruction from a user's input, and requests the certificate display unit 402 to acquire server certificate information. As a result of the request, after acquiring the server certificate information from the certificate display unit 402, the screen analysis/display unit 406 displays the server certificate information on the operation unit 219.

Figure 7:
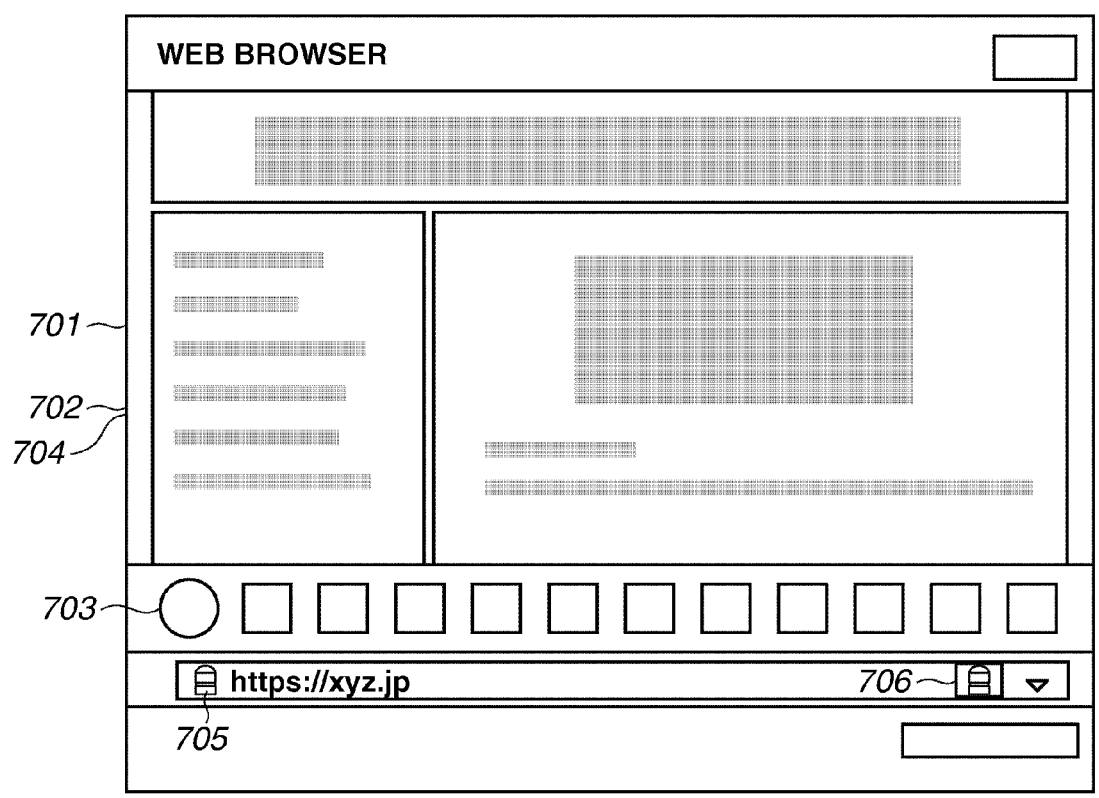
FIG. 7 illustrates a display example of the web browser 400 of the MFP 101 according to the first exemplary embodiment of the present invention.

FIG. 7 illustrates an example of a screen that the screen analysis/display unit 406 displays on the operation unit 219. FIG. 7 illustrates that the screen shows the communication state between the servlet application 410 and the web application 420 as an icon 706, according to a request from the encrypted communication state display unit 405. Normally, the communication state with the servlet application 410, which the web browser 400 is in direct communication with, is displayed in a field of an icon 705. FIG. 7 illustrates that the screen shows the communication state between the servlet application 410 and the web application 420 as the icon 706, separately from the icon 705. In this way, separately displaying whether internal communication uses the encrypted communication protocol and whether external communication uses the encrypted communication protocol enables a user to appropriately understand the communication state. The icon 705 corresponds to a first icon, and the icon 706 corresponds to a second icon.

The servlet application 410 includes an external communication unit 411, the internal communication unit 412, a screen generation unit 413, the encrypted communication notification unit 414, and a certificate acquisition unit 415. The servlet application 410 is a web server inside the MFP 101 which returns a processing result to a request transmitted from the web browser 400 as a response, like the web application 420.

The external communication unit 411 transmits a request to the web application 420 upon a reception of a request from the internal communication unit 412, and receives a response from the web application 420. Then, the external communication unit 411 transmits the response data received from the web application 420 to the screen generation unit 413. Further, the external communication unit 411 determines whether a communication protocol used in transmission and reception of a request/response to and from the web application 420 is HTTP or HTTPS. Then, the external communication unit 411 notifies the encrypted communication notification unit 414 and the certificate acquisition unit 415 of the determination result.

The internal communication unit 412 receives a request transmitted from the communication unit 401 of the web browser 400, and requests the external communication unit 411 to transmit a request to the web application 420. Further, the internal communication unit 412 generates a response upon a reception of a request from the screen generation unit 413 which will be described below, and transmits (returns) the generated response to the communication unit 401 of the web browser 400.

The screen generation unit 413 analyzes response data of the web application 420 transmitted from the above-described external communication unit 411, and acquires contents such as an HTML file and an image. The screen generation unit 413 analyzes the acquired contents such as an HTML file and an image, and generates screen information, i.e., an HTML file, adapted to be displayed on the operation unit 219 of the MFP 101. Then, the screen generation unit 413 requests the internal communication unit 412 to transmit a response, while providing the generated HTML file.

For example, the screen generation unit 413 generates a list screen showing a list of data stored in an external server. The data as a print target is selected from the data displayed on the list screen, and the external communication unit 411 acquires the selected data from the external server. The acquired data is converted into print data by the MFP 101, and the converted print data is printed on recording paper.

The encrypted communication notification unit 414 receives a notification from the external communication unit 411, and notifies the encrypted communication state display unit 405 of the web browser 400 that the communication state is HTTPS or HTTP. Further, the encrypted communication notification unit 414 acquires the server certificate information from the certificate acquisition unit 415, and transmits the acquired server certificate information to the encrypted communication state display unit 405.

The certificate acquisition unit 415 receives a notification from the external communication unit 411 and determines whether the communication state reported to the encrypted communication state display unit 405 of the web browser 400 is HTTPS. If the result of the determination indicates that the communication state is HTTPS, the certificate acquisition unit 415 analyzes the communication data between the external communication unit 411 and the web application 420, and acquires the server certificate used in the communication. The certificate acquisition unit 415 transmits the acquired server certificate information to the encrypted communication notification unit 414.

The web server 102 includes the web application 420. The web application 420 receives a request transmitted from an arbitrary client, and performs processing according to the request. After performing the processing according to the above-described request, the web application 420 generates and returns a response to the client that transmitted the request. For example, the web server 102 offers screen information to a request source as described above.

The first exemplary embodiment is described based on a cooperated web service in which the web application 420 transmits its stored data to the MFP 101, and the MFP 101 converts the transmitted data into print data and prints it. Therefore, the data that the web server 102 returns as a response to the external communication unit 411 is anyone of information about the list of data stored by the web application 420, and an actual data piece of data specified as a print target from the list.

Figure 5:
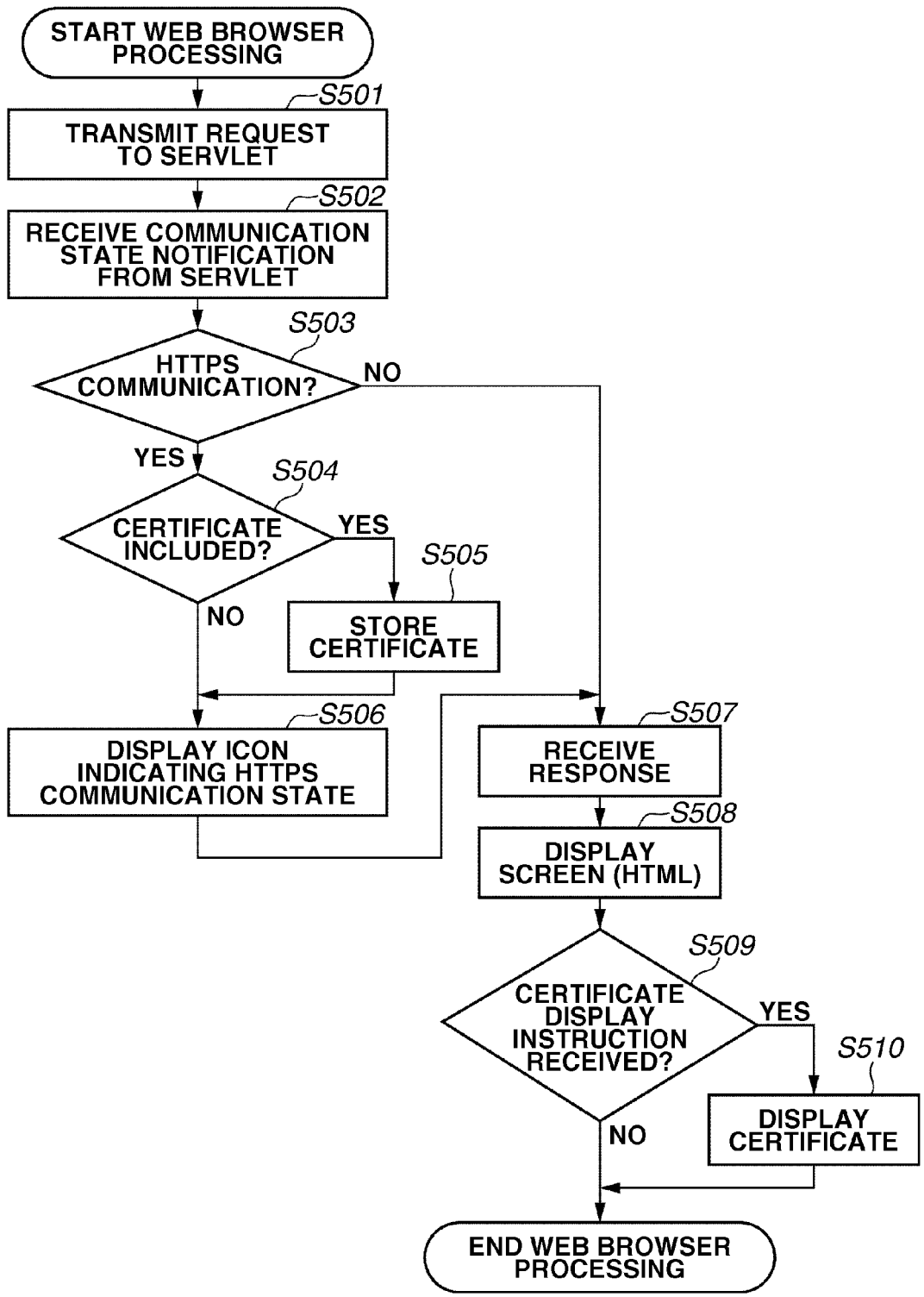
FIG. 5 is a flowchart illustrating an operation of a web browser 400 of the MFP 101 according to the first exemplary embodiment of the present invention.

FIG. 5 is a flowchart illustrating an operation of the web browser 400 of the MFP 101. Each processing (step) illustrated in the flowchart of FIG. 5 is realized by the CPU 211 of the MFP 101 executing the control program stored in the HDD 214.

In step S501, the communication unit 401 of the web browser 400 transmits a request for displaying an initial page of the web browser 400 to the servlet application 410. The request transmitted at this time may be information input via the operation screen displayed by the screen analysis/display unit 406 of the web browser 400 after the display of the initial page.

In step S502, the encrypted communication state display unit 405 receives an encrypted communication notification from the encrypted communication notification unit 414 of the servlet application 410, and sets an encryption notification reception flag to "TRUE". The details of the encrypted communication notification will be described below. If the encrypted communication state display unit 405 does not receive an encrypted communication notification from the servlet application 410, the encryption notification reception flag is set to "FALSE".

Further, the encrypted communication state display unit 405 may determine whether the transmission source of the encrypted communication notification is a web application outside the MFP 101 or the servlet application 410 inside the MFP 101. Accordingly, if the transmission source of the encrypted communication notification is a web application outside the MFP 101, the encrypted communication state display unit 405 may reject this encrypted communication notification to prevent a malicious notification from the outside of the MFP 101 from controlling the display of the encrypted communication state.

In step S503, if the encryption notification reception flag is "TRUE", the encrypted communication state display unit 405 determines whether the communication state between the servlet application 410 and the web application 420 is HTTPS by referring to the encrypted communication notification. If the communication state is HTTPS (YES in step S503), the processing proceeds to step S504. If the communication state is not HTTPS (NO in step S503), the processing proceeds to step S507.

On the other hand, if the encryption notification reception flag is "FALSE", the encrypted communication state display unit 405 determines that the communication state between the servlet application 410 and the web application 420 is HTTP. When the encryption notification reception flag is "FALSE", the web browser 400 can provide the display similar to the display when the servlet application 410 is not in communication with the web server outside the MFP 101. In other words, when the servlet application 410 does not transmit the encrypted communication notification, the web browser 400 does not display the icon 705 for indicating the encrypted communication state.

In step S504, the encrypted communication state display unit 405 determines whether the encrypted communication notification contains a server certificate. If the encrypted communication notification contains the server certificate (YES in step S504), the processing proceeds to step S505. If the encrypted communication notification does not contain the server certificate (NO in step S504), the processing proceeds to step S506.

In step S505, if the encrypted communication notification contains the server certificate, the encrypted communication state display unit 405 acquires the server certificate, and requests the certificate storage unit 403 to store the acquired server certificate. After receiving the request from the encrypted communication state display unit 405, the certificate storage unit 403 stores the server certificate contained in the encrypted communication notification in the certificate management DB 404.

In step S506, the encrypted communication state display unit 405 requests the screen analysis/display unit 406 to display the communication state between the servlet application 410 and the web application 420. After receiving the request from the encrypted communication state display unit 405, the screen analysis/display unit 406 displays the encrypted communication state on the operation unit 219, like the icon 706 illustrated in FIG. 7.

In step S507, the communication unit 401 receives a response from the servlet application 410. In step S508, the screen analysis/display unit 406 analyzes an HTML file contained in the response received by the communication unit 401, and displays an operation screen on the operation unit 219 based on the analysis result.

In step S509, the screen analysis/display unit 406 determines whether a server certificate display instruction is received via a user's input. If the server certificate display instruction is received (YES in step S509), the processing proceeds to step S510. More specifically, the screen analysis/display unit 406 determines whether the icon 706 is pressed. If the server certificate display instruction is not received (NO in step S509), the series of processing for transmitting and receiving a request and response is ended.

In step S510, the screen analysis/display unit 406 requests the certificate display unit 402 to acquire the server certificate information. After receiving the request, the certificate display unit 402 requests the certificate storage unit 403 to acquire the server certificate information. After receiving the request, the certificate storage unit 403 reads out the stored server certificate from the certificate management DB 404, and transmits the server certificate to the certificate display unit 402. The certificate display unit 402 transmits the server certificate information to the screen analysis/display unit 406. After receiving the server certificate information, the screen analysis/display unit 406 displays the server certificate information on the operation unit 219.

Figure 6:
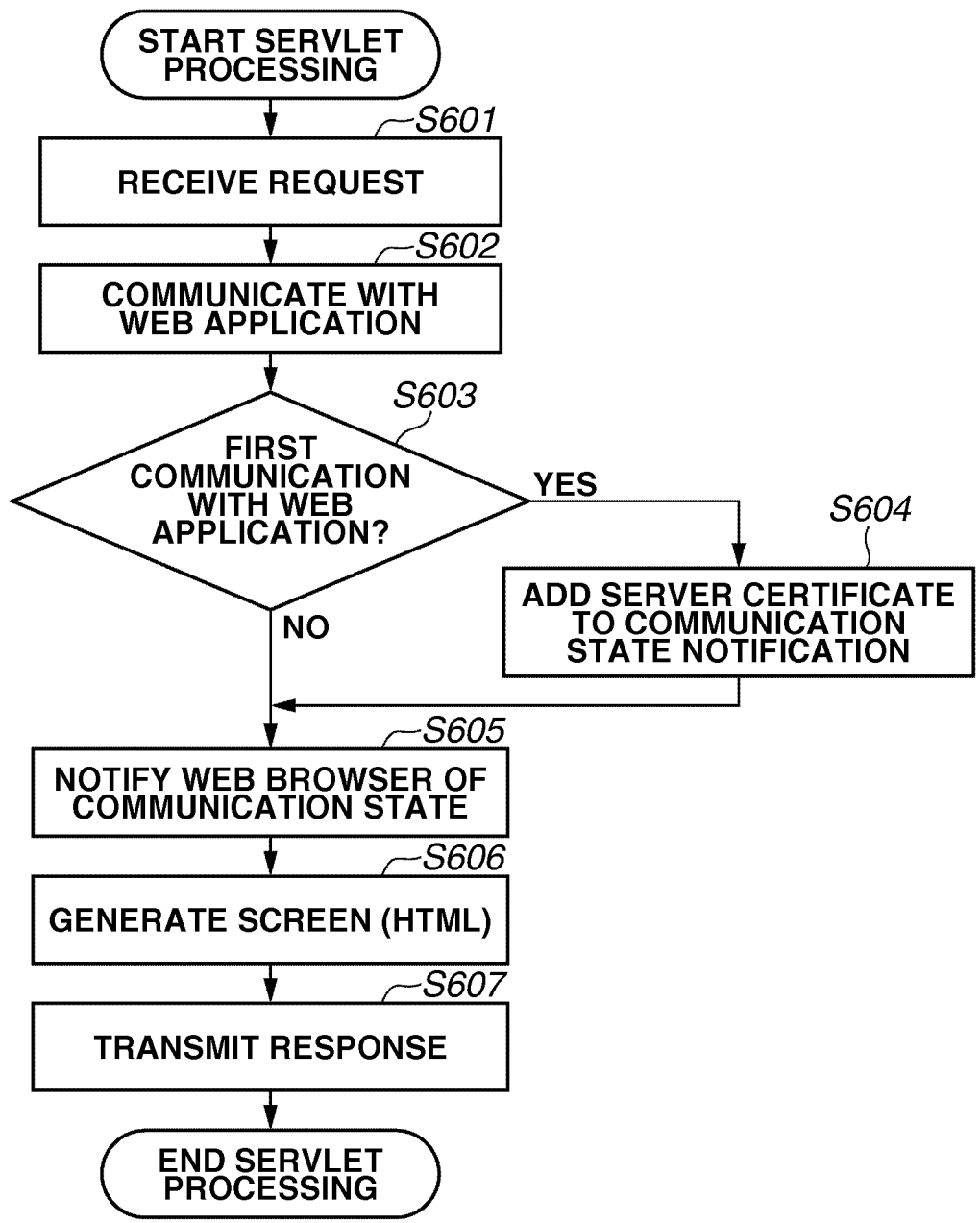
FIG. 6 is a flowchart illustrating an operation of a servlet application 410 inside the MFP 101 according to the first exemplary embodiment of the present invention.

FIG. 6 is a flowchart illustrating an operation of the servlet application 410 inside the MFP 101. Each processing (step) illustrated in the flowchart of FIG. 6 is realized by the CPU 211 of the MFP 101 executing the control program stored in the HDD 214.

In step S601, the inner communication unit 412 receives a request transmitted from the communication unit 401 of the web browser 400, and requests the external communication unit 411 to transmits a request to the web application 420.

In step S602, after receiving the request, the external communication unit 411 starts to transmit a request to the web application 420. The external communication unit 411 determines whether the communication protocol with the web application 420 is HTTP or HTTPS. If the communication protocol is HTTPS, the external communication unit 411 starts Secure Sockets Layer (SSL) encrypted communication with the web application 420. At this time, if the request communication with the web application 420 is the first communication, the web application 420 transmits a server certificate, and therefore the external communication unit 411 receives the server certificate.

In step S603, the external communication unit 411 determines whether the request communication with the web application 420 is the first communication. If the communication is the first communication (YES in step S603), the processing proceeds to step S604. If the communication is the second or subsequent request transmission (NO in step S603), the processing proceeds to step S605.

In step S604, the certificate acquisition unit 415 receives a notification from the external communication unit 411, and if the communication state is HTTPS, the certificate acquisition unit 415 analyzes the communication data between the external communication unit 411 and the web application 420 to acquire the server certificate used in the communication. The certificate acquisition unit 415 transmits the acquired server certificate information to the encrypted communication notification unit 414.

In step S605, the external communication unit 411 notifies the encrypted communication notification unit 414 and the certificate acquisition unit 415 of whether the communication protocol with the web application 420 is HTTP or HTTPS. After receiving the notification from the external communication unit 411, the encrypted communication notification unit 414 transmits an encrypted communication notification for notifying the encrypted communication state display unit 405 of the web browser 400 that the communication state is HTTP or HTTPS. Further, if the determination result in step S603 indicates that the communication is the first communication, the encrypted communication notification unit 414 acquires the server certificate information from the certificate acquisition unit 415, adds the acquired server certificate information to the encrypted communication notification, and then transmits the encrypted communication notification to the encrypted communication state display unit 405.

In step S606, the external communication unit 411 receives a response. Then, the external communication unit 411 transmits the response received from the web application 420 to the screen generation unit 413. The screen generation unit 413 analyzes the response of the web application 420 which is transmitted from the above-described external communication unit 411, and acquires contents such as an HTML file and an image. The screen generation unit 413 further analyzes the above-describe acquired contents such as the HTML file and the image, and generates an HTML file adapted to be displayed on the operation unit 219 of the MFP 101.

In step S607, the screen generation unit 413 requests the internal communication unit 412 to transmit a response, while providing the above-described generated HTML file. After receiving the request, the internal communication unit 412 generates a response, and transmits (returns) the generated response to the communication unit 401 of the web browser 400.

In this way, if the servlet application (web server function) inside the MFP exists to intermediate between the web browser of the MFP and the web server outside the MFP, it is possible to appropriately notify the web browser of the communication state. Accordingly, if the communication state of inner communication inside the MFP is different from the communication state of communication with the external web server outside the MFP, it is possible to appropriately indicate the communication state with the web server outside the MFP to a user. Further, since the notification of the communication state to the web browser contains server certificate information, it is possible to appropriately display not only the communication state with the web server outside the MFP but also the server certificate information of the web server outside the MFP according to a user's instruction.

Figure 8:
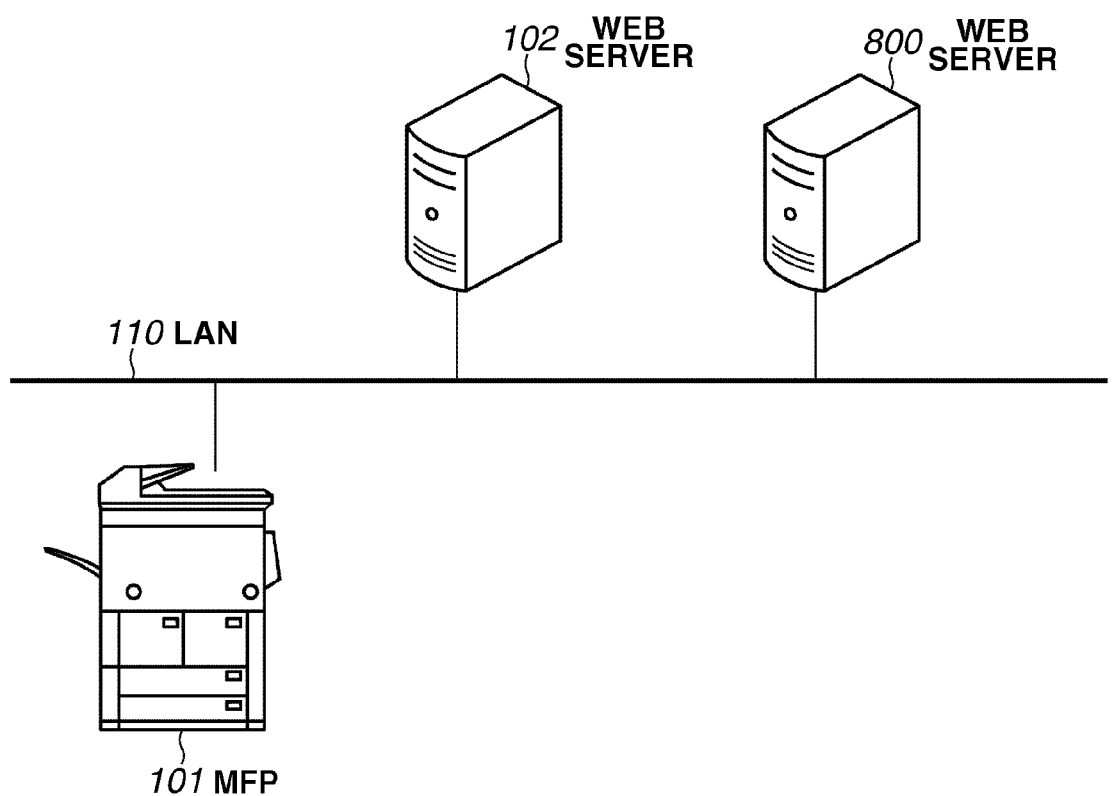
FIG. 8 illustrates an entire information processing system according to a second exemplary embodiment of the present invention.

FIG. 8 illustrates an entire information processing system according to a second exemplary embodiment of the present invention. The MFP 101, the web server 102, and a web server 800 are connected to the LAN 110 and can communicate with one another. In a case where the servlet application 410 inside the MFP 101 is supposed to communicate with web applications in a plurality of web servers as illustrated in FIG. 8, the communication protocol may vary depending on the respective web applications.

In this case, the first exemplary embodiment of the present invention cannot manage to indicate the states of the communication protocols with the respective web applications to a user. Therefore, the second exemplary embodiment of the present invention will be now described as an embodiment allowing the servlet application 410 in the MFP 101 to notify the web browser 400 of the states of the communication protocols with the plurality of web applications to indicate them to a user.

Figure 9:
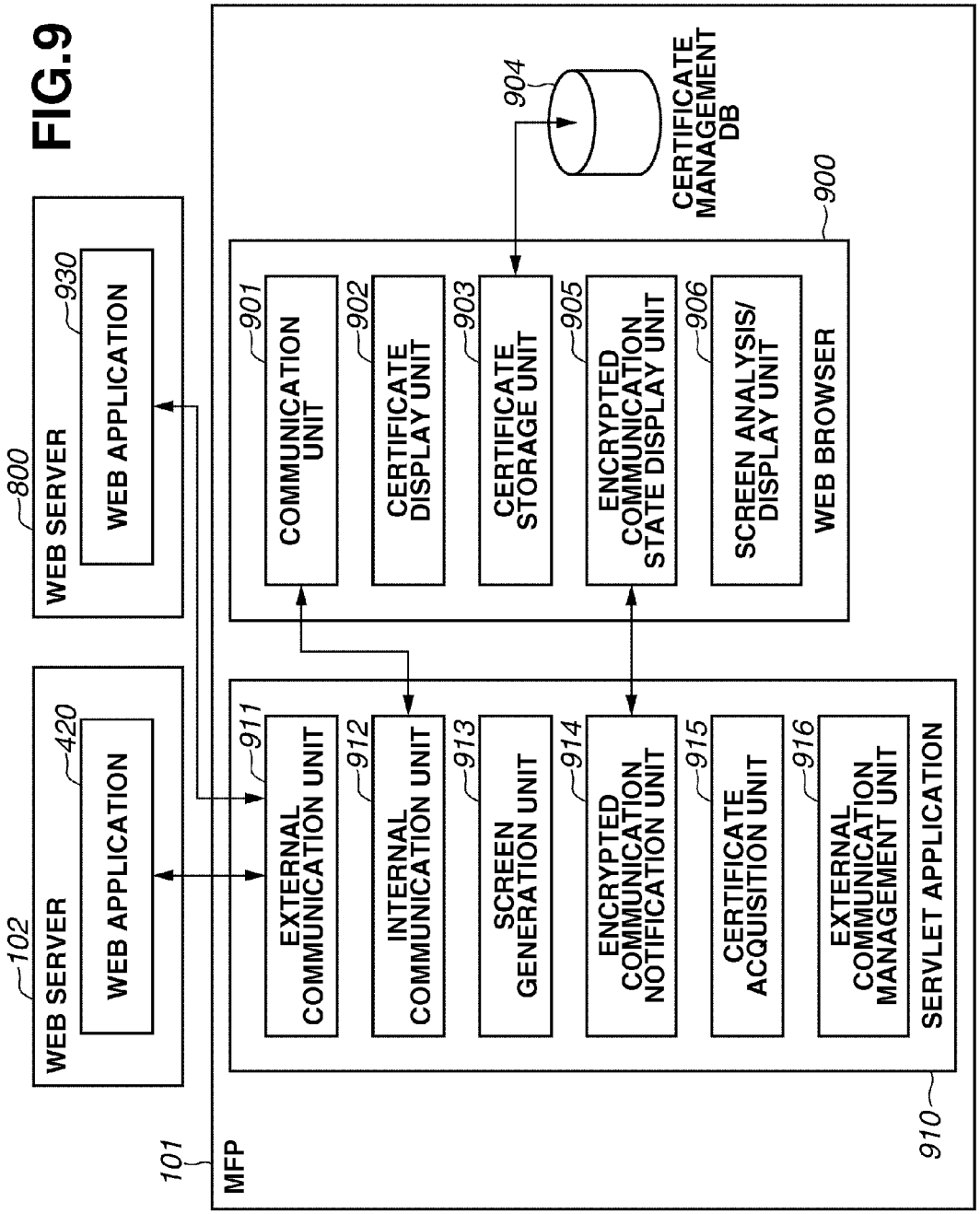
FIG. 9 illustrates a software configuration of the information processing system according to the second exemplary embodiment of the present invention.

FIG. 9 illustrates a software configuration of the entire information processing system. The CPUs 211 and 311 respectively included in the MFP 101 and the web server 102 execute the control programs, thereby realizing the respective units in the configuration illustrated in FIG. 9. The MFP 101 includes a web browser 900 and a servlet application 910. The CPU 211 included in the MFP 101 executes the control program, thereby realizing the web browser 900 and the servlet application 910, respectively.

As is the case with the example illustrated in FIG. 4, the web browser 900 is not limited to a web browser which displays contents of the web server 102 and the servlet application 910. At the same time, the web server 102 and the servlet application 910 are not limited to a web server and a servlet application which transmit and receive a request/response according to the HTTP protocol. The web browser 900 may be embodied by any unit capable of functioning to acquire a content through communication with an arbitrary server and display the acquired content on a screen.

Further, the system illustrated in FIG. 9 includes two external web servers, but may be configured to include two or more web servers. The web browser 900 includes a communication unit 901, a certificate display unit 902, a certificate storage unit 903, a certificate management unit DB 904, an encrypted communication state display unit 905, and a screen analysis/display unit 906.

The communication unit 901 communicates with an internal communication unit 912 in the servlet application 910 according to the HTTP protocol or the HTTPS protocol. More specifically, the communication unit 901 transmits information input via an operation screen displayed by the screen analysis/display unit 906 of the web browser 900, as a request to the servlet application 910 which will be described below. Further, the communication unit 901 receives a response (processing result) transmitted from the servlet application 910.

The certificate display unit 902 displays the information about a server certificate used in communication, when the servlet application 910 is in communication using the HTTPS protocol with the web application 420 and/or the web application 903. More specifically, the certificate display unit 902 requests the certificate storage unit 903 to acquire server certificate information, upon a reception of a request from the screen analysis/display unit 906. After receiving the server certificate information from the certificate storage unit 903, the certificate display unit 902 transmits the server certificate to the screen analysis/display unit 906.

The certificate storage unit 903 stores the information about the server certificate used in communication into the certificate management DB 904, upon a reception of a request from the encrypted communication state display unit 905. The certificate storage unit 903 stores the server certificate information, only when the servlet application 910 is in communication with at least one external server using the HTTPS protocol. Further, the certificate storage unit 903 reads out the stored server certificate from the certificate management DB 904 and transmits the server certificate to the certificate display unit 902, in response to a request from the certificate display unit 902.

The encrypted communication state display unit 905 receives an encrypted communication notification from an encrypted communication notification unit 914. The encrypted communication state display unit 905 determines whether the communication state with the web application 420 and/or 930 is HTTPS using the encrypted communication notification as a trigger. Then, the encrypted communication state display unit 905 requests the screen analysis/display unit 906 to display the communication state of the encrypted communication. Further, the encrypted communication state display unit 905 acquires a server certificate contained in the encrypted communication notification, and requests the certificate storage unit 903 to store the acquired server certificate.

The screen analysis/display unit 906 analyzes an HTML file contained in a response that the communication unit 901 receives, and displays an operation screen on the operation unit 219 based on the analysis result. At this time, the screen analysis/display unit 906 displays an encrypted communication state, if the screen analysis/display unit 906 receives a request from the encrypted communication state display unit 905. Further, the screen analysis/display unit 906 receives a server certificate display instruction via a user's input, and requests the certificate display unit 902 to acquire the server certificate information. As a result of the request, after acquiring the server certificate information from the certificate display unit 902, the screen analysis/display unit 906 displays the server certificate information on the operation unit 219.

Figure 12:
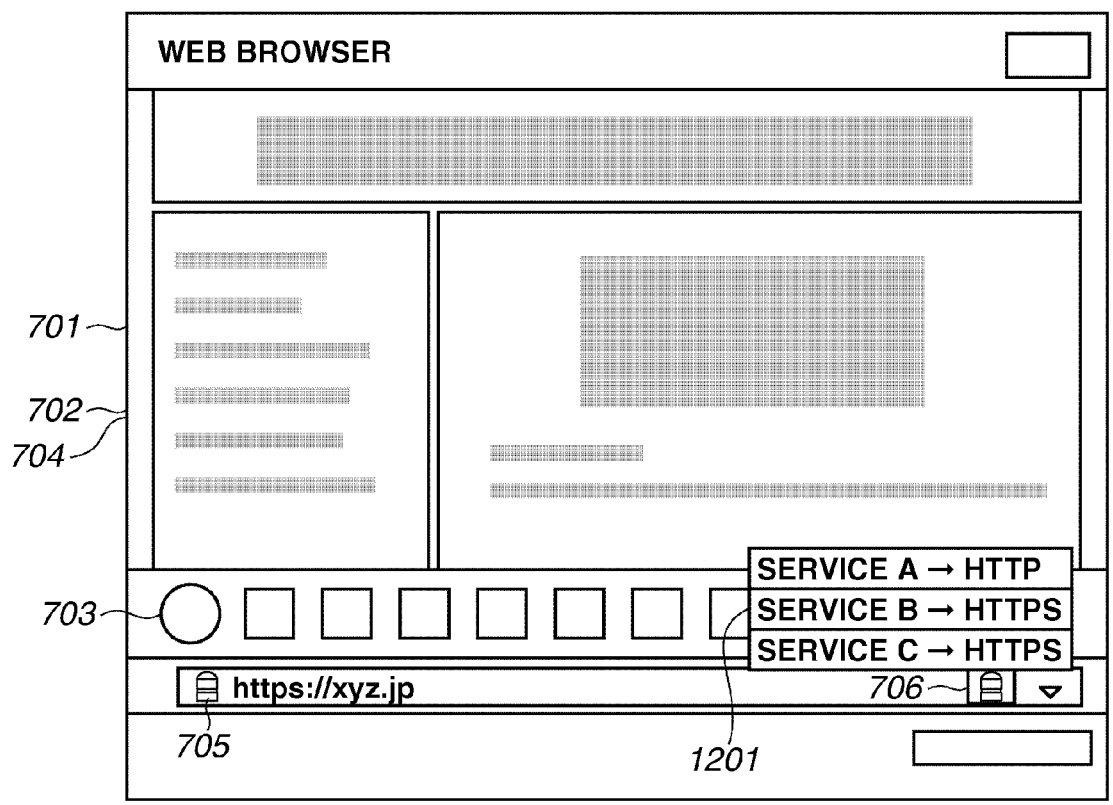
FIG. 12 illustrates a display example of the web browser 400 of the MFP 101 according to the second exemplary embodiment of the present invention.

FIG. 12 illustrates an example of a screen that the screen analysis/display unit 906 displays on the operation unit 219. FIG. 12 illustrates that the screen shows the communication state between the servlet application 910 and the web application 420 and/or 930 as the icon 706, according to a request from the encrypted communication state display unit 905. Normally, the communication state with the servlet application 910, which the web browser 900 is in direct communication with, is displayed as the icon 705.

FIG. 12 illustrates that the screen shows the communication state between the servlet application 910 and the web application 420 and/or the web application 930 as the icon 706 and indications 1201, separately from the icon 705. Further, the screen also shows the communication state between the web browser 900 and the web application 420. In FIG. 12, a service A corresponds to the servlet application 910, a service B corresponds to the web application 420, and a service C corresponds to the web application 930.

The servlet application 910 includes an external communication unit 911, the internal communication unit 912, a screen generation unit 913, the encrypted communication notification unit 914, a certificate acquisition unit 915, and an external communication management unit 916. The servlet application 910 is a web server function inside the MFP 101 which returns a processing result to a request transmitted from the web browser 900 as a response, similarly to the web application 420 of the web server 102.

The external communication unit 911 transmits requests to the web application 420 and the web application 930 upon a reception of a request from the internal communication unit 912 which will be described below, and receives responses from the web application 420 and the web application 930. Then, the external communication unit 911 transmits the responses received from the web application 420 and the web application 930 to the screen generation unit 913.

Further, the external communication unit 911 determines whether the communication protocol used in transmission and reception of a request/response to and from the web application 420 and the web application 930 is HTTP or HTTPS. Then, the external communication unit 911 notifies the encrypted communication notification unit 914 and the certificate acquisition unit 915 of the determination result. Further, the external communication unit 911 notifies the external communication management unit 916 of whether the communication protocol with each of the web application 420 and the web application 930 is HTTP or HTTPS.

The internal communication unit 912 receives a request transmitted from the communication unit 901 of the web browser 900, and requests the external communication unit 911 to transmit requests to the web application 420 and the web application 930. Further, the internal communication unit 912 generates a response upon a reception of a request from the screen generation unit 913 which will be described below, and transmits (returns) the generated response to the communication unit 901 of the web browser 900.

The screen generation unit 913 analyzes responses of the web application 420 and the web application 930 transmitted from the above-described external communication unit 911, and acquires contents such as an HTML file and an image. The screen generation unit 913 further analyzes the above-described acquired contents such as the HTML file and the image, and generates an HTML file adapted to be displayed on the operation unit 219 of the MFP 101. Then, the screen generation unit 913 requests the internal communication unit 912 to transmit a response, while providing above-described generated HTML file.

The encrypted communication notification unit 914 receives a notification from the external communication unit 911, and notifies the encrypted communication state display unit 905 of the web browser 900 that the communication state is HTTPS or HTTP. At this time, if either the communication state with the web application 420 or the communication state with the web application 930 is HTTPS, the encrypted communication notification unit 914 notifies the encrypted communication state display unit 905 of the web browser 900 that the communication is HTTPS.

If both the communication state with the web application 420 and the communication state with the web application 930 are HTTP, the encrypted communication notification unit 914 notifies the encrypted communication state display unit 905 of the web browser 900 that the communication state is HTTP. Further, the encrypted communication notification unit 914 acquires the server certificate information from the certificate acquisition unit 915, and transmits the acquired server certificate information to the encrypted communication state display unit 905.

The certificate acquisition unit 915 receives a notification from the external communication unit 911, and determines whether the communication state reported to the encrypted communication state display unit 905 of the web browser 900 is HTTPS. If the result of the determination indicates that the communication state is HTTPS, the certificate acquisition unit 915 analyzes the communication data between the external communication unit 911 and the web applications 420 and 930, and acquires the server certificate used in the communication. At this time, if both the communication state with the web application 420 and the communication state with the web application 930 are HTTPS, the certificate acquisition unit 915 acquires the server certificates of both the servers. The certificate acquisition unit 915 transmits the acquired server certificate information to the encrypted communication notification unit 914.

The web server 102 includes the web application 420. The web application 420 receives a request transmitted from an arbitrary client, and performs processing according to the request. After performing the processing according to the above-described request, the web application 420 generates and returns a response to the client that transmitted the request.

Similarly, the web server 800 includes the web application 930. The web application 930 receives a request transmitted from an arbitrary client, and performs processing according to the request. After performing the processing according to the above-mentioned request, the web application 930 generates a response and returns the generated response to the client that transmitted the request.

Figure 10:
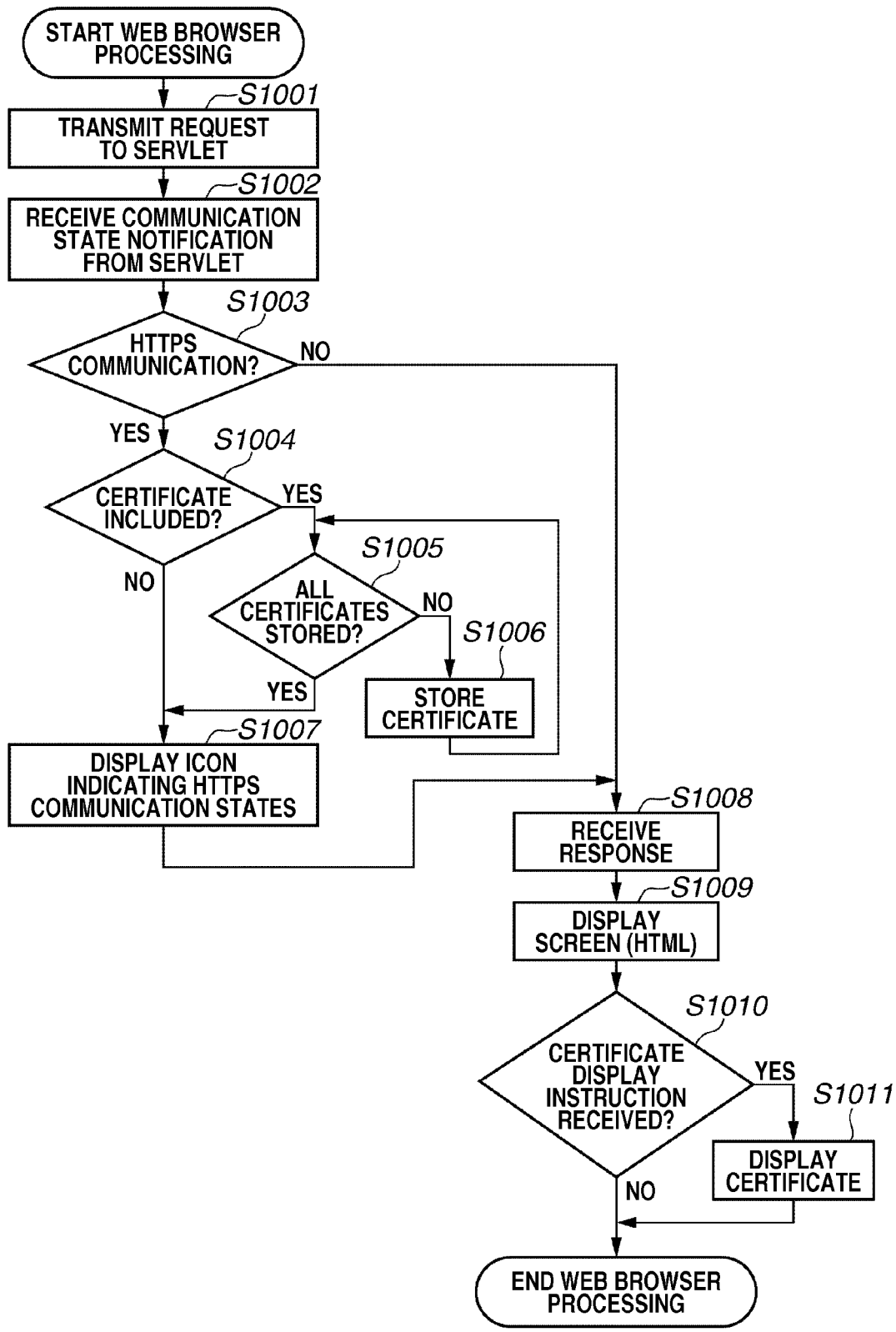
FIG. 10 is a flowchart illustrating an operation of the web browser 400 of the MFP 101 according to the second exemplary embodiment of the present invention.

FIG. 10 is a flowchart illustrating an operation of the web browser 900 of the MFP 101. Each processing (step) illustrated in the flowchart of FIG. 10 is realized by the CPU 211 of the MFP 101 executing the control program stored in the HDD 214.

In step S1001, the communication unit 901 of the web browser 900 transmits a request for displaying an initial page of the web browser 900 to the servlet application 910. The request transmitted at this time may be information input via the operation screen displayed by the screen analysis/display unit 906 of the web browser 900 after the display of the initial page.

In step S1002, the encrypted communication state display unit 905 receives an encrypted communication notification from the encrypted communication notification unit 914 of the servlet application 910, and sets an encrypted notification reception flag to "TRUE". If the encrypted communication state display unit 905 does not receive an encrypted communication notification from the servlet application 910, the encrypted notification reception flag is set to "FALSE". The encrypted communication state display unit 905 may determine whether the transmission source of the encrypted communication notification is a web application outside the MFP 101 or the servlet application 910 inside the MFP 101.

In step S1003, if the encrypted notification reception flag is "TRUE", the encrypted communication state display unit 905 determines whether the communication state between the servlet application 910 and the web application 420 is HTTPS by referring to the encrypted communication notification. On the other hand, if the encrypted notification reception flag is "FALSE", the encrypted communication state display unit 905 determines that the communication state between the servlet application 910 and the web application 420 is HTTP.

If the communication state is HTTPS (YES in step S1003), the processing proceeds to step S1004. If the communication state is not HTTPS (NO in step S1003), the processing proceeds to step S1008. In step S1004, the encrypted communication state display unit 1005 determines whether the encrypted communication notification contains any server certificate. If the encrypted communication notification contains the server certificate (YES in step S1004), the processing proceeds to step S1005. If the encrypted communication notification does not contain the server certificate (NO in step S1004), the processing proceeds to step S1007.

In step S1005, it is determined whether all server certificates are stored. If all server certificates are stored (YES in step S1005), the processing proceeds to step S1007. If any server certificate is left to be stored (NO in step S1005), the processing proceeds to step S1006.

In step S1006, the encrypted communication state display unit 905 acquires the server certificate, and requests the certificate storage unit 903 to store the server certificate. After receiving the request from the encrypted communication state display unit 905, the certificate storage unit 903 stores the server certificate contained in the encrypted communication notification into the certificate management DB 904.

In step S1007, the encrypted communication state display unit 905 requests the screen analysis/display unit 906 to display the communication state between the servlet application 910 and the web applications 420, and the communication state between the servlet application 910 and the web application 930. After receiving the request from the encrypted communication state display unit 905, the screen analysis/display unit 906 displays the encrypted communication states on the operation unit 219, like the icon 706 illustrated in FIG. 12.

In step S1008, the communication unit 901 receives a response from the servlet application 910.

In step S1009, the screen analysis/display unit 906 analyzes an HTML file contained in the response received by the communication unit 901, and displays an operation screen on the operation unit 219 based on the analysis result.

In step S1010, the screen analysis/display unit 906 determines whether a server certificate display instruction is received via a user's input. If the server certificate display instruction is received (YES in step 1010), the processing proceeds to step S1011. If the server certificate display instruction is not received (NO in step S1010), the series of processing for transmitting and receiving a request and response is ended.

In step S1011, the screen analysis/display unit 906 requests the certificate display unit 902 to acquire the server certificate information of the web server specified by the user. After receiving the request, the certificate display unit 902 requests the certificate storage unit 903 to acquire the server certificate information. After receiving the request, the certificate storage unit 903 reads out the stored server certificate from the certificate management DB 904, and transmits the server certificate to the certificate display unit 902. Finally, the certificate display unit 902 transmits the server certificate information to the screen analysis/display unit 906. After receiving the server certificate information, the screen analysis/display unit 906 displays the server certificate information on the operation unit 219.

Figure 11:
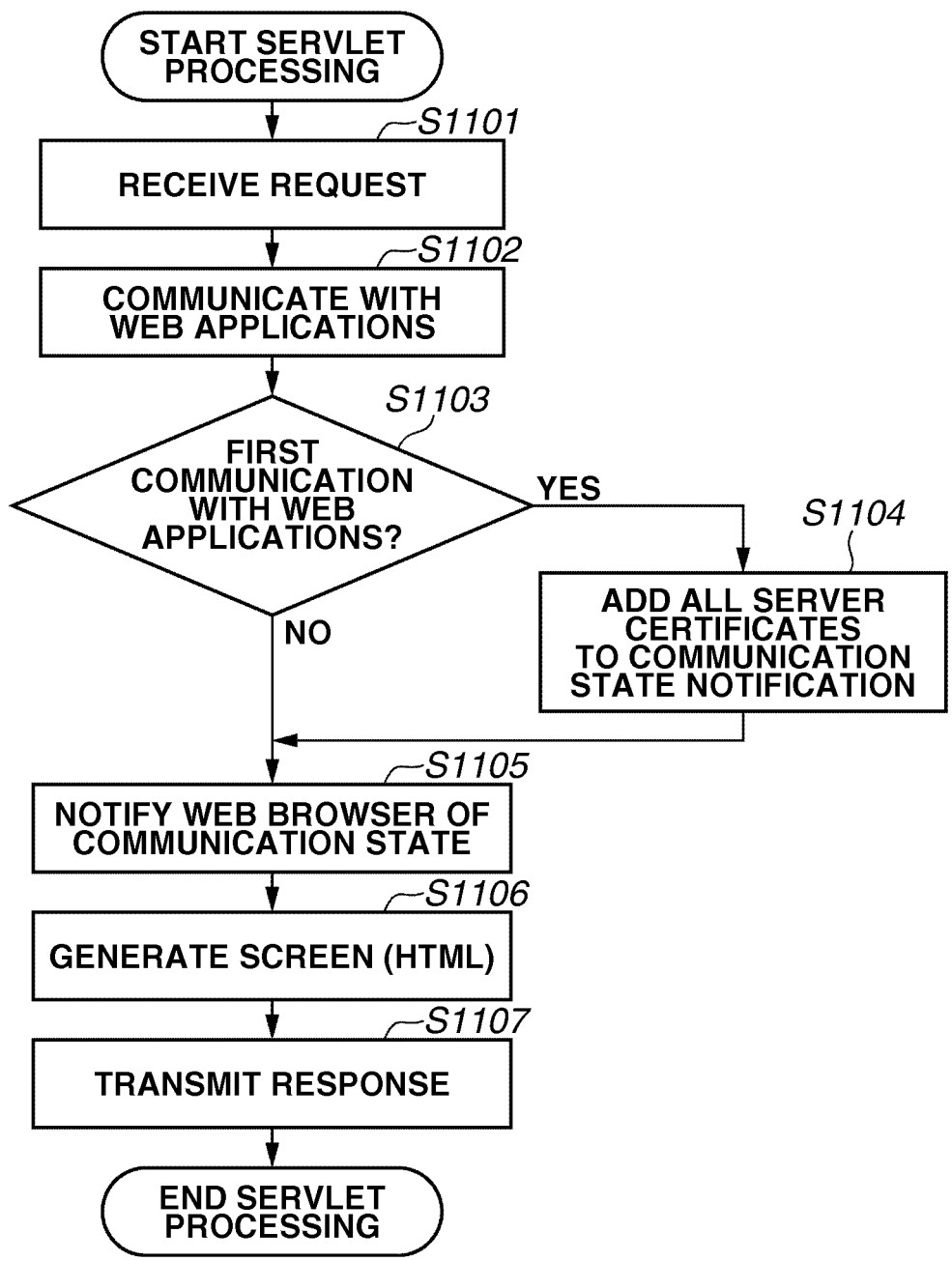
FIG. 11 is a flowchart illustrating an operation of the servlet application 410 inside the MFP 101 according to the second exemplary embodiment of the present invention.

FIG. 11 is a flowchart illustrating an operation of the servlet application 910 inside the MFP 101. Each processing (step) illustrated in the flowchart of FIG. 11 is realized by the CPU 211 of the MFP 101 executing the control program stored in the HDD 214.

In step S1101, the inner communication unit 912 receives a request transmitted from the communication unit 901 of the web browser 900, and requests the external communication unit 911 to transmit requests to the web application 420 and the web application 930.

In step S1102, after receiving the transmission request, the external communication unit 911 starts to transmit requests to the web application 420 and the web application 930. The external communication unit 911 determines whether the communication protocol with the web application 420 is HTTP or HTTPS. If the communication protocol is HTTPS, the external communication unit 911 starts SSL encrypted communication with the web application 420. At this time, if the request communication with the web application 420 is the first communication, the web application 420 transmits a server certificate, and therefore the external communication unit 911 receives the server certificate.

Similarly, the external communication unit 911 determines whether the communication protocol with the web application 930 is HTTP or HTTPS. If the communication protocol is HTTPS, the external communication unit 911 starts SSL encrypted communication with the web application 930. At this time, if the request communication with the web application 930 is the first communication, the web application 930 transmits a server certificate, and therefore the external communication unit 911 receives the server certificate.

In step S1103, the external communication unit 911 determines whether the request communication with the web application 420 and the web application 930 is the first communication. If the communication is the first communication (YES in step S1103), the processing proceeds to step S1104. If the communication is the second or subsequent request communication (NO in step S1103), the processing proceeds to step S1105.

In step S1104, the certificate acquisition unit 915 receives a notification from the external communication unit 911, and determines whether the communication state between the external communication unit 911 and the web application 420 is HTTPS. If the determination result indicates that the communication state is HTTPS, the certificate acquisition unit 915 analyzes the communication data between the external communication unit 911 and the web application 420, and acquires the server certificate used in the communication.

Similarly, if the communication state between the external communication unit 911 and the web application 930 is HTTPS, the certificate acquisition unit 915 analyzes the communication data between the external communication unit 911 and the web application 930, and acquires the server certificate used in the communication. The certificate acquisition unit 915 transmits the acquired server certificate information to the encrypted communication notification unit 914.

In step S1105, the external communication unit 911 notifies the external communication management unit 916 and the certificate acquisition unit 915 that the communication protocols with the web application 420 and the web application 930 are HTTP or HTTPS. After receiving the notification from the external communication unit 911, the external communication management unit 916 notifies the encrypted communication notification unit 914 of the respective communication states between the external communication unit 911 and the web application 420, and between the external communication unit 911 and the web application 930.

Further, after receiving the notification from the external communication management unit 916, the encrypted communication notification unit 914 notifies the encrypted communication state display unit 905 of the web browser 900 that the communication states are HTTPS or HTTP by transmitting an encrypted communication notification. Furthermore, if the determination result in step 1103 indicates that the communication is the first communication, the encrypted communication notification unit 914 acquires the server certificate information from the certificate acquisition unit 915, adds the server certificate information to the encrypted communication notification, and then transmits the encrypted communication notification to the encrypted communication state display unit 905.

In step S1106, the external communication unit 911 receives responses. Then, the external communication unit 911 transmits the responses received from the respective web application 420 and web application 930 to the screen generation unit 913. The screen generation unit 913 analyzes the above-described response of the web application 420 which is transmitted from the external communication unit 911, and acquires contents such as an HTML file and an image. Similarly, the screen generation unit 913 analyzes the above-described response of the web application 930 which is transmitted from the external communication unit 911, and acquires contents such as an HTML file and an image.

The image generation unit 913 further analyzes the above-described acquired contents such as the HTML file and the image, and generates an HTML file adapted to be displayed on the operation unit 219 of the MFP 101.

In step S1107, the screen generation unit 913 provides the above-described generated HTML file to the internal communication unit 912, and requests the internal communication unit 912 to transmit a response. After receiving the request, the internal communication unit 912 generates a response, and transmits (returns) the generated response to the communication unit 901 of the web browser 900.

In this way, if there is a plurality of web servers in the system like the first exemplary embodiment of the present invention, it is possible to appropriately notify the web browser of the communication states. Accordingly, if the communication states with the outside of the MFP are different according to the communication destinations, it is possible to appropriately indicate the communication states with the web servers outside the MFP to a user.

Further, if a web server is subjected to mashup and mediates another web server, employment of the function of the servlet application 910 according to the present exemplary embodiment enables the web browser to appropriately indicate the communication states with the web server outside the MFP to a user. In other words, the present exemplary embodiment enables the web server to notify the servlet application 910 of the information about the communication state with the other web server.

Accordingly, the communication states with the web servers outside the MFP can be notified to the web browser 900 and appropriately indicated to a user. Further, since the communication state notification transmitted to the web browser contains the server certificate information, it becomes possible to not only indicate the communication states with the web servers outside the MFP but also indicate the server certificate information to a user according to a user's instruction.

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. All of combinations of the features described in the exemplary embodiments are not always essential to the means for solution according to the invention. The scope of the following claims is to be accorded the broadest interpretation so as to encompass all modifications, equivalent structures, and functions.

This application claims priority from Japanese Patent Application No. 2010-212397 filed Sep. 22, 2010, which is hereby incorporated by reference herein in its entirety.

What is claimed is:

1. An image forming apparatus capable of communicating with an external server, the image forming apparatus comprising:
   a browser configured to communicate with a server according to a communication protocol set to the server capable of providing screen information, receive the screen information, and display a screen; and
   a web server,
   wherein the web server comprises:
   an external communication unit configured to receive data from the external server;
   a determination unit configured to determine whether the external communication unit is in communication with the external server using an encrypted communication protocol for encrypting data for communication; and
   an internal communication unit configured to transmit, to the browser, a notification indicating that the communication is performed using the encrypted communication protocol and screen information generated based on data received from the external server, in a case where the determination unit determines that the communication is performed using the encrypted communication protocol,
   wherein the browser includes a display unit configured to display, in a case where the display unit receives the notification which is transmitted from the internal communication unit and indicates that the communication is performed using the encrypted communication protocol, the screen based on the screen information so as to display a second icon which indicates that the web server uses the encrypted communication protocol to communicate with the external server and is different from a first icon indicating that the browser uses the encrypted communication protocol to communicate with the web server, and
   wherein the image forming apparatus further includes a printing unit configured to receive print target data from the external server, convert the received data into print data, and print the converted print data, in a case where printing is instructed via the screen displayed by the display unit.

2. The image forming apparatus according to claim 1, wherein the web server further includes an acquisition unit configured to acquire a server certificate to be used in the communication with the external server from the external server in a case where the determination unit determines that the communication is performed using the encrypted communication protocol, wherein the internal communication unit transmits the server certificate acquired by the acquisition unit, and wherein the display unit displays information of the server certificate transmitted from the internal communication unit in response to pressing of the second icon.

3. The image forming apparatus according to claim 2, wherein the display unit displays the first icon in a case where the web server is set so as to perform communication using the encrypted communication protocol.

4. The image forming apparatus according to claim 3, wherein the internal communication unit transmits a notification indicating that the communication is not performed using the encrypted communication protocol, in a case where the determination unit determines that the communication is not performed using the encrypted communication protocol, and wherein the display unit displays the screen based on the screen information without displaying both the first icon and the second icon, in a case where the web server is set so as to perform communication using the encrypted communication protocol, and the display unit receives the notification, which is transmitted from the internal communication unit and indicates that the communication is not performed using the encrypted communication protocol.

5. The image forming apparatus according to claim 4, wherein the external communication unit receives data from a plurality of external servers, wherein the determination unit determines whether at least one external server of the plurality of external servers performs communication using the encrypted communication protocol for encrypting data for communication, and in a case where the determination unit determines that at least one external server performs communication using the encrypted communication protocol, the acquisition unit acquires the server certificate to be use in the communication with the external server determined as the server which performs communication using the encrypted communication protocol, wherein the internal communication unit transmits the notification indicating that the communication is performed using the encrypted communication protocol, the screen information generated based on data received from the plurality of external servers, and the server certificate acquired by the acquisition unit, wherein the display unit displays, in a case where the display unit receives the notification which is transmitted from the internal communication unit and indicates that the communication is performed using the encrypted communication protocol, the screen based on the screen information so as to display the second icon which is indicates that the web server uses the encrypted communication protocol to communicate with the external server and is different from the first icon indicating that the browser uses the encrypted communication protocol to communicate with the web server, and wherein the display unit displays information of the server certificate transmitted from the internal communication unit in response to pressing of the second icon.

6. A method for controlling an image forming apparatus capable of communicating with an external server, the method comprising:

causing a browser to communicate with a server according to a communication protocol set to the server capable of providing screen information, to receive the screen information, and to display a screen;

causing an external communication unit of a web server included in the image forming apparatus to receive data from the external server;

causing a determination unit of the web server to determine whether the external communication unit is in communication with the external server using an encrypted communication protocol for encrypting data for communication;

causing an internal communication unit of the web server to transmit, to the browser, a notification indicating that the communication is performed using the encrypted communication protocol and screen information generated based on data received from the external server, in a case where the determination unit determines that the communication is performed using the encrypted communication protocol;

causing a display unit of the browser to display, in a case where the display unit receives the notification which is transmitted from the internal communication unit and indicates that the communication is performed using the encrypted communication protocol, the screen based on the screen information so as to display a second icon which is indicates that the web server uses the encrypted communication protocol to communicate with the external server and is different from a first icon indicating that the browser uses the encrypted communication protocol to communicate with the web server; and causing a printing unit to receive print target data from the external server, convert the received data into print data, and print the converted print data, in a case where printing is instructed via the screen displayed by the display unit.

7. A non-transitory computer-readable storage medium storing a program for causing an image forming apparatus to execute a method according to claim 6.

* * * * *